United States Patent [19]

Crichton

[11] 4,421,942
[45] Dec. 20, 1983

[54] THERMOCOUPLE MOUNTING SYSTEM

[75] Inventor: John F. Crichton, Oakville, Canada

[73] Assignee: Robertshaw Controls Company, Richmond, Va.

[21] Appl. No.: 328,176

[22] Filed: Dec. 7, 1981

[51] Int. Cl.³ .......................................... H01L 35/28
[52] U.S. Cl. .................................... 136/217; 136/242
[58] Field of Search .............. 136/217, 218, 219, 220, 136/242

[56] References Cited

U.S. PATENT DOCUMENTS

| 3,615,872 | 10/1971 | Braucksiek | 136/217 |
| 3,650,872 | 3/1982 | Kenyon | 136/217 |
| 3,709,740 | 1/1973 | Kenyon | 136/217 |

Primary Examiner—Leland A. Sebastian

[57] ABSTRACT

Tube containing thermocouple is inserted through mounting sheath having fingers with projections in groove around tube, and sheath is inserted through flanges of pilot burner bracket and secured by split clip.

3 Claims, 7 Drawing Figures

THERMOCOUPLE MOUNTING SYSTEM

BACKGROUND OF THE INVENTION

Thermocouples are conventionally mounted on a bracket so that the tip of the thermocouple is in the flame of a pilot burner for a furnace or the like. Since thermocouples must be replaced from time to time, and the details of the mounting brackets are not the same for the various manufacturers, there has long been a need for continued improvements in replacement thermocouple units which can readily be used in as many installations as possible. Such replacement units are disclosed in U.S. Pat. Nos. 3,522,107; 3,620,849; 3,650,843; and 3,709.740, and are exemplified by the replacement thermocouples supplied by Robertshaw Controls Company of Richmond, Va. and designated A 1900, A 1910, and A 1970. While these earlier replacement units represented advances in the art at the time of their introduction, further simplification of manufacture and use has remained an important objective. Also, improvements in cooling of the thermocouple are desirable.

SUMMARY OF THE INVENTION

The thermocouple system of the present invention provides an improved hollow cylindrical sheath for mounting combines an elongated thermocouple element in a bracket next to a pilot burner, for sensing heat from the burner. The sheath has integral fingers at one end extending generally parallel to the central axis of the sheath. These fingers initially slide over the tube around the outside of the thermocouple element as the tube is pushed through the sheath, and then engage a locating groove around the tube. The tube is thus securely held after it has been pushed through the sheath to a predetermined extent for proper positioning when the sheath has been secured to the mounting bracket. This sheath construction is convenient to manufacture and works very well with a conventional smooth-surfaced thermocouple tube having the required locating groove, and thus makes it unnecessry to form the exterior threads around the tube as shown in the above mentioned patents. Also, the sheath of the present invention provides substantial contact surface for escape of heat from the thermocouple tube to the sheath, and thereby helps to limit the temperature of the thermocouple and thus prolong its life.

The invention is particularly advantageous in making it feasible to make a minimum number of parts which can be supplied in a minimum number of kits for replacing thermocouple elements in the widest variety of conventional pilot burner installations now in common use. The replacement thermocouple element itself may be the same as one previously in common use for the same purpose, which has a groove suitable for cooperation with the above-mentioned projections from the sheath fingers to locate the tip so that it projects a predetermined amount from the sheath. The improved sheath has means, such as a flange and spring clip, to mount it in a common form of pilot bracket having openings large enough to receive the improved sheath. When the tip is to be inserted in another common form of pilot bracket, which has openings too small to receive the sheath, the thermocouple tube is inserted through these openings without the sheath and is conventionally located by engagement with its conventional lower skirt and held by another form of spring clip.

BRIEF DESCRIPTION OF THE DRAWINGS

The drawings show a present preferred embodiment of the invention, in which.

DETAILED DESCRIPTION OF THE PRESENT PREFERRED EMBODIMENT

Figure 2:
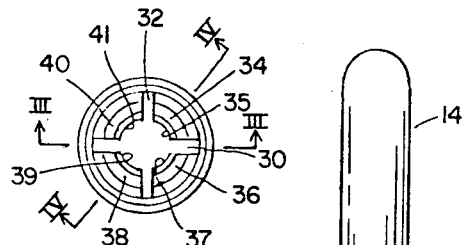
FIG. 2 is an enlarged end view of the top of the thermocouple mounting sheath shown in FIG. 1, with the thermocouple tube and bracket omitted.
Figure 3:
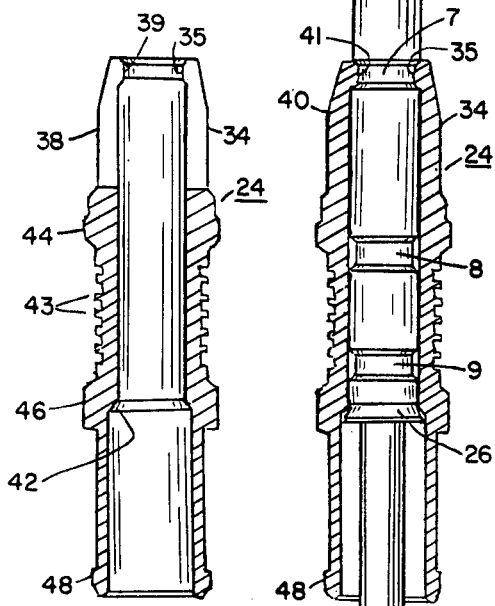
FIG. 3 shows a section on the line III—III in FIG. 2.
Figure 4:
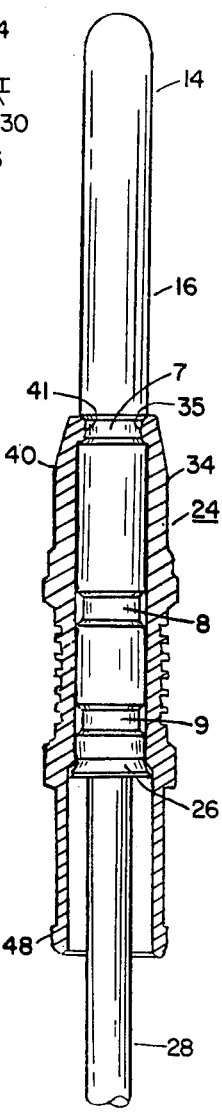
FIG. 4 shows a section on the line IV—IV in FIG. 2, showing the sectioned sheath and including the thermocouple tube in the sheath.

Referring now to the accompanying drawing, and initially to FIGS. 1-4, there is shown a pilot burner hood 10 projecting a flame 12 across the tip 14 of a tube 16 containing a thermocouple. The burner 10 is carried on a bracket 18 which also has a pair of flanges 20 and 22 with openings therethrough receiving a sheath 24 around the tube 16. The tube 16 is in the form of a hollow cylinder which terminates at its lower end in an outwardly flared skirt 26 (FIG. 4). Three spaced annular grooves 7, 8 and 9 are indented around tube 16. A flexible tube 28 has one end connected to the lower end of the thermocouple in tube 16 and its other end (not shown) detachably connected to a suitable thermoelectric appliance (not shown). An electrical conductor within tube 28 connects the thermocouple in tube 16 to the thermoelectric appliance to signal whether flame 12 is coming from burner 10. All of these elements are conventional, except for the improvements hereinafter described in sheath 24 and its connections with the thermocouple tube and mounting bracket.

Referring now more particularly to FIGS. 2, 3 and 4, sheath 24 is cylindrical with an opening therethrough to receive tube 16, and has slots 30 and 32 cut through the central axis of its end nearest to the thermocouple tip 14. These slots form fingers 34, 36, 38 and 40 which taper on the outside and thus diminish in thickness toward their extremities and have radially inwardly extending projections 35, 37, 39 and 41 at their extremities. The fingers are flexible and cause these projections to move apart and resiliently press against tip 14 while sliding along it when it is inserted in sheath 24. When projections 35, 37, 39 and 41 reach groove 7 of tube 16, as it is pushed further into sheath 24, they are pressed by the fingers into groove 7, where they fit closely. Groove 7 thus locates and holds tube 16 in its desired predetermined position in sheath 24. This holding action is supplemented by engagement of skirt 26 with a shoulder 42 in tube 16, which takes place when the finger projections enter groove 7. When this occurs, inside surfaces of the fingers 34, 36, 38 and 40 (between their projections 35, 37, 39 and 41 and their juncture with the main body of sheath 24) extend parallel to the axis of the cylindrical tube-receiving opening through sheath 24 and curve concentrically with and thereby fit against the cylindrical outer surface of tube 16, as illustrated in FIGS. 2 and 4. The shoulder 42 is at the junction between a bore extending through sheath 24 from its finger end, for slidably receiving tube 6, and a bore of larger diameter extending through sheath 24 from its opposite end for receiving skirt 26.

The outer surface of the central portion of sheath 24 has a series of circular ribs 43 which help to dissipate heat when sheath 24 is mounted with these ribs exposed to the air. A pair of projecting annular flanges 44 and 46 are formed in sheath 24 at opposite ends of the set of ribs 43, to facilitate mounting the sheath 24 in various forms of conventional brackets, of which the bracket 18 is only one example. The bottom of sheath 24, opposite to the end with fingers 34-40, terminates in a smaller annular outer flange 48, and the outer surface of sheath 24 between flanges 46 and 48 is preferably of uniform diameter, to facilitate mounting the sheath in a supporting bracket.

Figure 1:
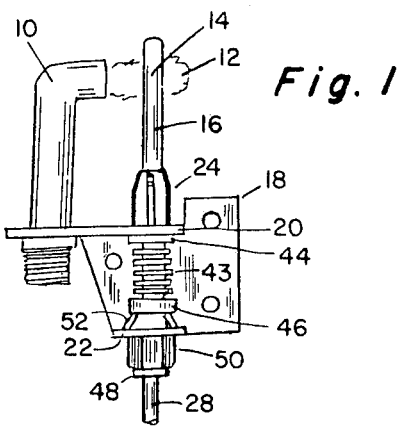
FIG. 1 is a side elevational view of a thermocouple-pilot assembly in a typical mounting bracket.
Figure 5:
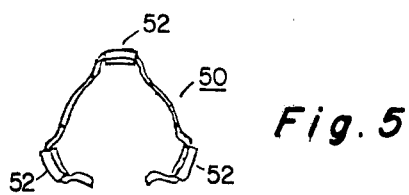
FIG. 5 shows an enlarged end view of the clip shown in FIG. 1 holding the lower end of the sheath to the lower flange of the mounting bracket.
Figure 6:
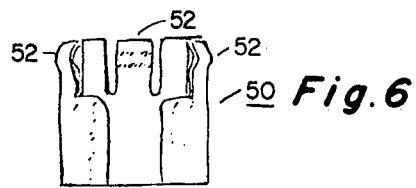
FIG. 6 shows a front view of the clip shown in FIG. 5.

When mounting sheath 24 in bracket 18, the sheath is passed upwardly through a relatively large opening in the lower bracket flange 22 and through a smaller opening through the upper bracket flange 20 until the upper sheath flange 44 engages the under side of upper bracket flange 20. The lower sheath flange 46 is then above the lower bracket flange 22, and the sheath is held in that position in bracket 18 by split clip 50 (FIGS. 1 and 5-6). The clip is made of stiff but resilient sheet metal in semicircular form so that it can be sprung apart enough to slip around and then grip the outside of sheath 24 between its flanges 46 and 48. The lower end of clip 50 engages the top of sheath flange 48. The upper end of clip 50 has outwardly bowed extensions 52 which flex inwardly enough to pass upwardly through the opening through lower bracket flange 22, but which spring back outwardly again to press upwardly against sheath flange 46 and downwardly against the top side of lower bracket flange 22 when upper sheath flange 44 engages the under side of upper bracket flange 20. Sheath 24 is thus locked securely in its desired position in bracket 18, with thermocouple tip 14 in the path of flame 12 from burner 10.

Figure 7:
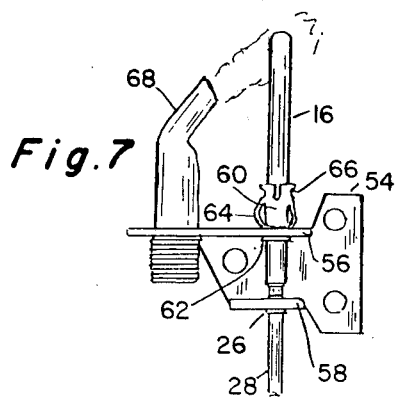
FIG. 7 is a side elevation view of another form of thermocouple-pilot assembly, in which the thermocouple tube is the same one illustrated in FIGS. 1 and 4 but the bracket and mounting clip is different, and the sheath is not used.

Thermocouple tube 16 can be mounted alternatively in other forms of conventional brackets in which sheath 24 is not required, such as the bracket 54 shown in FIG. 7. Bracket 54 has openings through its upper and lower flanges 56 and 58, just large enough to receive tube 16, which is passed upwardly through them until its skirt 26 engages the under side of lower bracket flange 58. Before that, however, a clip 60 (like the clip 170 shown in FIGS. 9-11 of U.S. Pat. No. 3,709.740) is inserted upwardly through the opening in the upper bracket flange 56 until an outwardly flared skirt 62 formed in the bottom of clip 60 engages the under side of bracket flange 56. Resilient fingers 64 on opposite sides of clip 60 deflect to permit the clip to be pushed up through the opening in flange 56, and lock the clip there by subsequently pressing down on the top of flange 56. When tube 16 is passed upwardly through the openings in bracket flanges 56 and 58 it passes up through the inside of clip 60 until an annular indentation 66 around the upper end of clip 60 has completed its sliding movement along the end of tube 16 and has entered groove 7 of tube 16. Clip indentation 66 resiliently locks in tube groove 7 at the same time that tube skirt 26 engages bracket flange 58 This locks tube 16 in proper position relative to flame from burner hood 68 mounted in bracket 54.

While present preferred embodiments and practices of the invention have been illustrated and described, the invention may be otherwise embodied and practiced within the scope of the following claims.

I claim:

1. A thermocouple assembly for use with a burner in a mounting bracket with spaced openings for receiving the thermocouple, said assembly comprising an elongated thermocouple tube having a cylindrical outside surface which is mostly of uniform diameter but which includes a locating groove indented in and extending around the outside of the tube, said tube terminating in a closed tip at one end and an outwardly extending flange at the other end, and an elongated sheath having outer flanges for mounting it in a burner bracket, and having a cylindrical opening therethrough for receiving the thermocouple tube, the tube being long enough for its tip end to project out of one end of the sheath when the flange on the opposite end of the tube engages the sheath, said sheath having its said one end divided into integral fingers projecting parallel to the axis of said cylindrical opening and resiliently biased to press their tips toward the tube, the tips of said fingers having projections extending radially inward therefrom to enter into the locating groove, and the locating groove being positioned to receive the finger projections when the flange on the tube engages the sheath, whereby the tube is securely but removably held in a desired predetermined position.

2. A thermocouple assembly in accordance with claim 1, in which heat dissipating ribs extend integrally around the sheath, and each finger has an inwardly facing surface adapted to curve concentrically with and thus fit against the uniform diameter portion of the thermocouple tube when the projection at the finger's tip enters the locating groove, thereby facilitating heat transfer from the thermocouple tube to the finger.

3. A thermocouple assembly in accordance with claim 2, in which each finger has an end portion which tapers on the outside and thus diminishes in thickness towards its tip.

* * * * *